Figure 1:
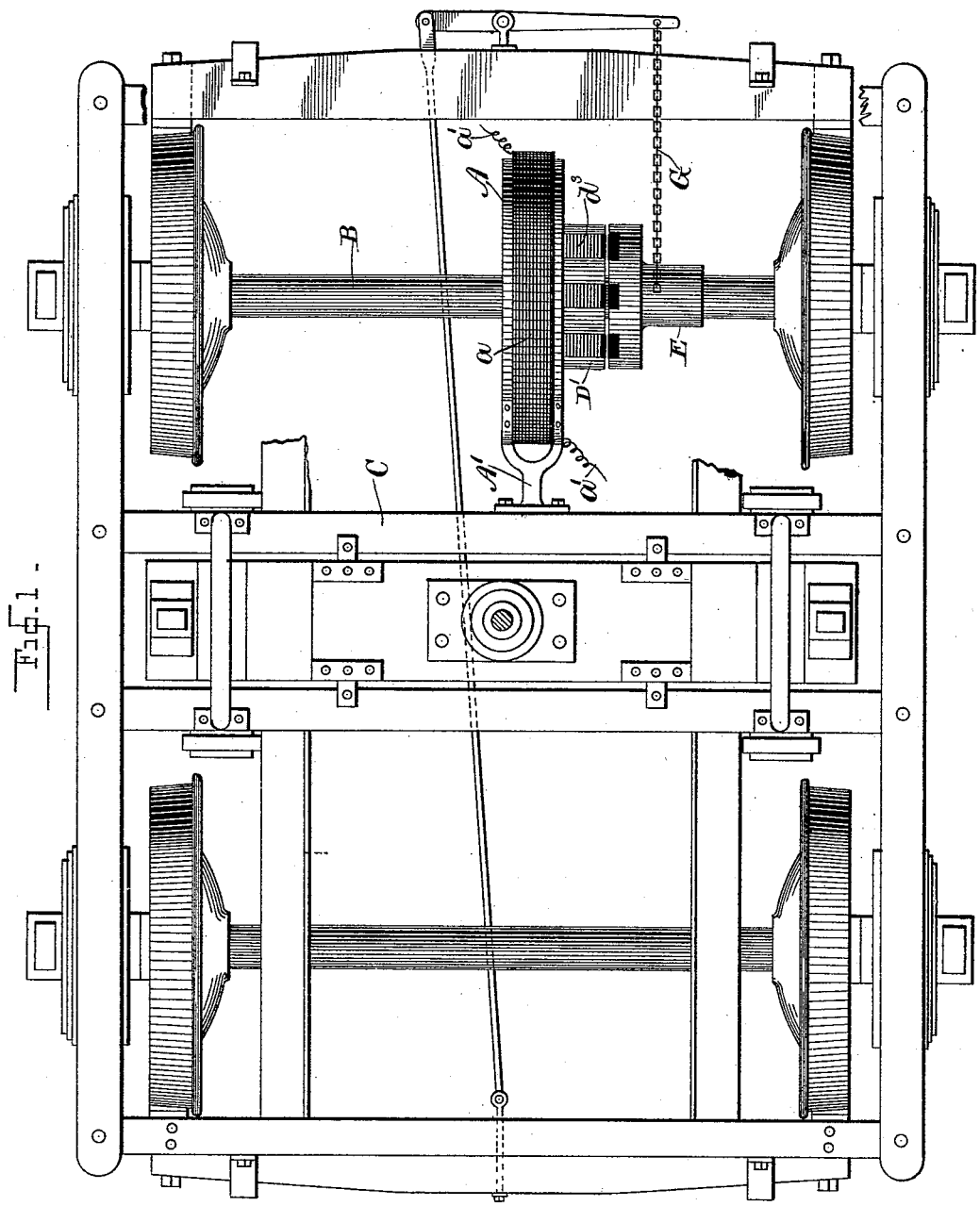

(No Model.) 3 Sheets—Sheet 1.

J. C. HENRY.
ELECTRO MAGNETIC CAR BRAKE.

No. 499,543. Patented June 13, 1893.

Witnesses
Wm. A. Courtland
A. C. Orne

Inventor
John C. Henry.
by Bentley & Blodgett
Attys.

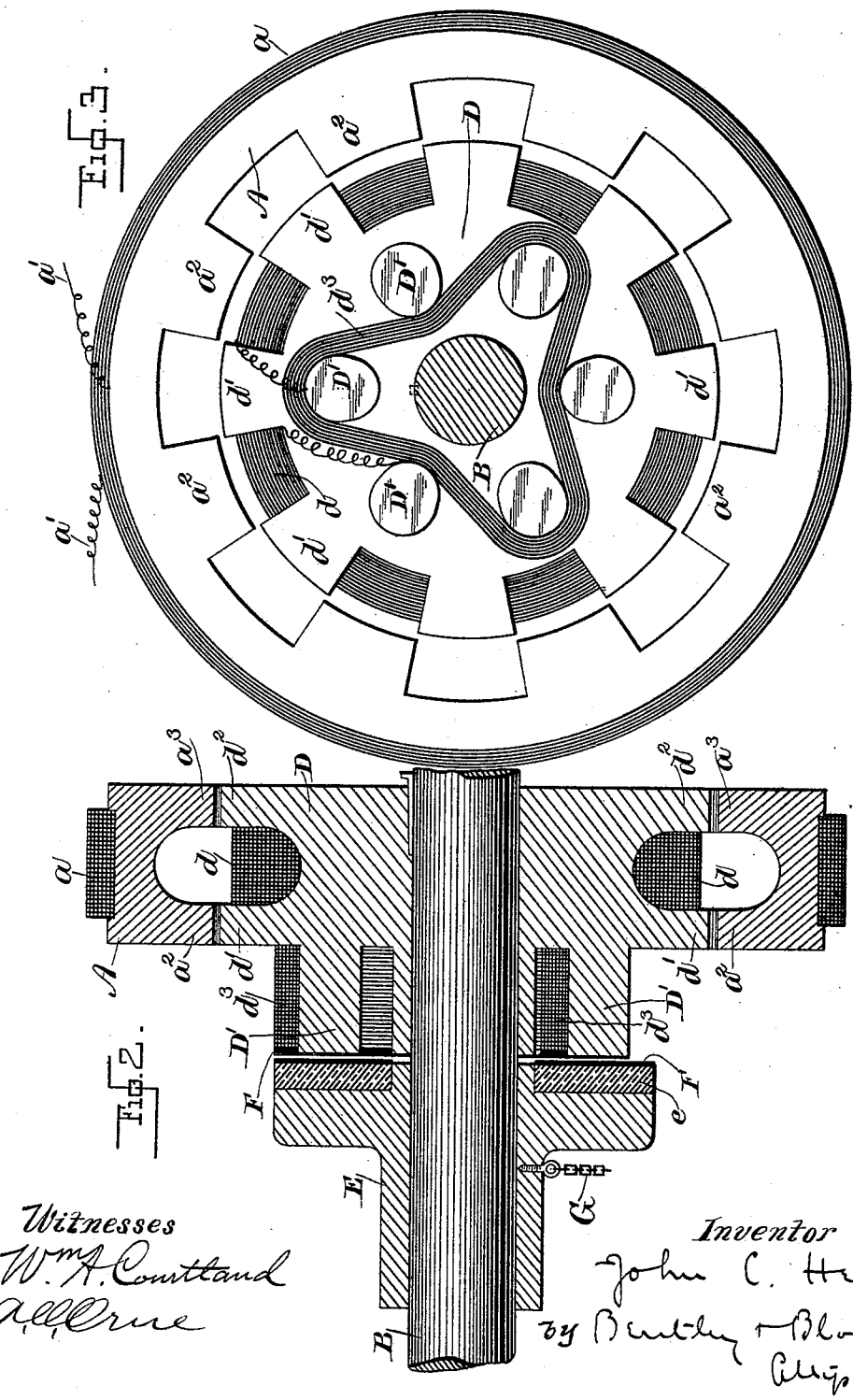

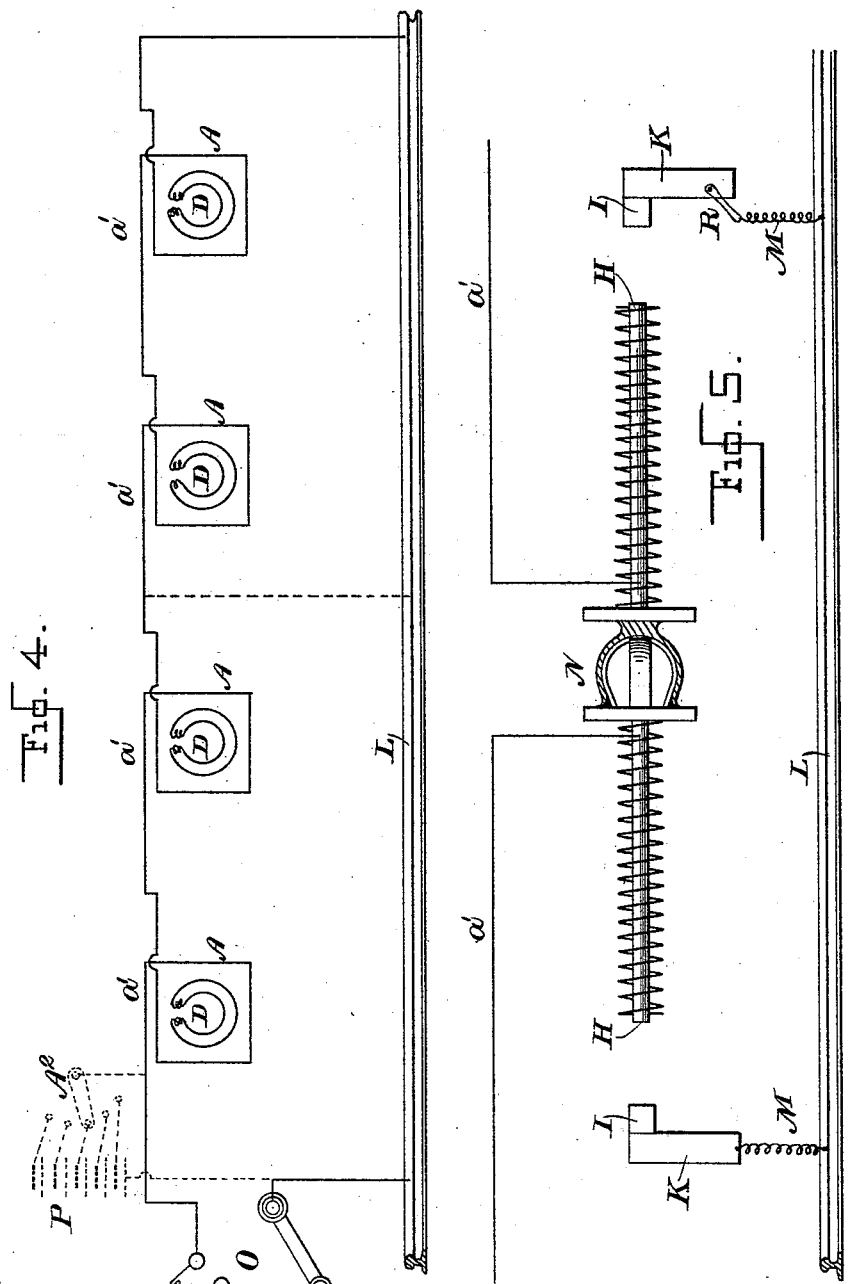

UNITED STATES PATENT OFFICE.

JOHN C. HENRY, OF WESTFIELD, NEW JERSEY.

ELECTRO-MAGNETIC CAR-BRAKE.

SPECIFICATION forming part of Letters Patent No. 499,543, dated June 13, 1893.

Application filed August 8, 1892. Serial No. 442,427. (No model.)

*To all whom it may concern:*

Be it known that I, JOHN C. HENRY, a citizen of the United States, residing at Westfield, in the county of Union and State of New Jersey, have invented a certain new and useful Improvement in Electro-Magnetic Car-Brakes, of which the following is a specification.

The invention relates to improvements in brakes for railway cars.

The object is to provide a train of cars with electric brakes which are controlled automatically from any part of the train, in the event of accident, but are ordinarily operated by the locomotive engineer. The advantage is that if any part of the train becomes detached the brakes are automatically applied on the rear section. Moreover, the invention overcomes a great objection now common to all forms of brakes, viz: sliding the wheels. With the air or hand brake flat wheels are very common, being caused by too great pressure on the brake shoes, and the fact that the engineer has no means of knowing when the car wheels are sliding. It is well-known to experienced railway men that to get the most effective braking action the wheels should be allowed to turn slowly. If they are locked and allowed to slide they wear flat, and slide along with more freedom than if allowed to rotate slowly.

My present brake is in a sense of the momentum class; *i. e.*, wherein the energy of the moving car is used to retard its movement. This result is effected by electricity derived from a generator on each separate car, thereby making said cars independent units capable of being assembled in series relation and controlled from one point. The general plan is to supply one of the axles on each car with a combined dynamo and magnetic clutch. Ordinarily no current is generated by the dynamo. But when it is desired to retard the movement of the car, then by closing the circuit across the dynamo terminals either manually or automatically the generator induces an alternate current which actuates powerful magnets, which in turn close the magnetic clutch and cause a drum, normally loose on the axle, to wind up the brake chain. By controlling the amount of current generated, through and by a rheostat, any desired pressure may be obtained against the brake shoes. Should the car wheels stop rotating from any cause the dynamos stop inducing current and the magnetic clutch is released. In the dynamo and clutch the circuits in the moving parts, *i. e.*, the armature and clutch, are closed, and have no connection with the external circuits. The use of brushes, collectors, &c., is entirely avoided. The field magnet terminals on each car extend to spring couplings at each end of the car. Ordinarily these spring couplings are grounded or connected with the wheels and rails which form the return circuit. When, however, the cars are coupled together, this connection is broken, and the circuit is completed throughout the entire train. The terminals lead to a rheostat under the engineer's control.

In the drawings Figure 1 represents a plan of a railway car truck showing the assembled brake mechanism. Fig. 2 represents a sectional view of the combined generator and clutching mechanism. Fig. 3 is an end view of the same with the clutch winding drum removed. Fig. 4 is a diagram of the circuits. Fig. 5 is a view of the coupling used between the cars and the automatic circuit closing switch.

The generators and clutching mechanism are composed of three parts, all of which are arranged concentrically around one of the axles of the truck.

The field magnet A is stationary. It is an annular casting surrounding the axle B and supported by a bracket A' secured to the truck frame C. It has an external peripheral groove to receive a winding $a$ of insulated wire whose terminals, shown at $a'$, $a'$, Fig. 3, are connected with coupling devices at the ends of the car, as hereinafter described. Each face of the annulus has an interiorly projecting flange, the two flanges being notched at regular intervals to form pairs of pole pieces $a^2$, $a^3$. When a current of electricity is passed through the coil $a$, the pole pieces become polarized, those around one face, as $a^2$, being of opposite polarity to the others, $a^3$.

Keyed upon the axle B is the armature D. It consists of a grooved wheel, having in the groove a winding $d$ of insulated wire. A series of pole pieces $d'$, $d^2$, corresponding in number with the poles of the field magnets, project from each edge of the wheel, and the armature is arranged within the field magnet A, so that the pole pieces $a^2$, $d'$ and $a^3$, $d^2$ lie in the same planes, respectively. Projecting from one face of the armature are one or more magnet cores $D'$, around which the winding $d^3$ is carried, its terminal being connected with those of the armature winding $d$ to form a closed circuit. The faces of the cores $D'$ lie in the same plane of rotation. Loosely mounted on the axle B is a drum E having a magnetic face $e$ adjacent to the cores $D'$. When more than one core $D'$ is used, the winding $d^3$ is arranged to give opposite polarities to adjacent cores; and the face of the drum has alternate magnetic and non-magnetic sections. The cores and the drums are provided with non-magnetic friction and wearing plates F. These parts constitute my magnetic clutch. When the cores $D'$ are magnetized, they attract the drum E and compel it to rotate with them, thereby winding up the brake chain G, and applying the brake. Since the only obstacle to the sliding of the face $e$ on the cores $D'$ is the magnetic attraction, it is evident that this can be so regulated as to permit the drum to slip before the brakes are applied hard enough to slide the car wheels.

At each end of the car is arranged a coupling connected with the field magnet terminals. This may be of any suitable construction, but I prefer that shown in Fig. 5, in which the wire $a'$ is connected with a spring plunger H, held normally by the spring against the contact I on the end sill K, said contact being connected with the rail L through the wheels of the truck. When coupled with the spring plunger on the adjacent car, the plunger H is obliged to be drawn away from the contact I, breaking the ground circuit M. Any suitable device may be used to couple the plungers, such as the male and female spring coupling N. When the train is coupled up, the rear terminal $a'$ is grounded, and the forward one also is connected with the rail through a rheostat O, preferably located in the locomotive cab. The rheostat may, however, be located at any point in the circuit, which, it will be seen, includes all the field magnets in series.

The operation is as follows: When the field circuit is closed, the rotating armatures generate an alternating current in said circuit, which reacts by induction on the armature, the maximum efficiency being quickly reached. The armature currents magnetize their clutches, and the brakes are simultaneously applied. Should any brake go on so hard as to slide the wheels, the rotation of the armature at once stops and the current ceases, releasing the clutch and allowing the brakes to slack off. By means of the rheostat the engineer can regulate the resistance of the field and thereby govern the strength of the armature currents and the resulting magnetic power of the clutches. Should the train break in two while in motion, the spring plungers instantly close the circuit at the rear of the forward section and the front of the rear section, thus causing the brakes to be automatically applied on the rear section, and preventing it from following and colliding with the rear of the front section. In order to prevent the brakes from acting when a car is being shunted in a yard, the switch R may be opened, thereby breaking the circuit of the field magnet. The brake chain G should be made so short that it will be all unwound when the brakes are off, so that it may be wound up in either direction, depending upon the direction in which the train is moving.

Instead of being mounted concentric with the axle, the mechanism may be carried on a counter-shaft, geared to the axle.

To avoid the possibility of all of the generators working in synchronism and producing a neutralizing effect, a battery or other independent source of energy may be placed in the circuit. In this event I would prefer to have a series of battery cells P and a switch A to place one or more of the separate elements in the circuit so that the engineer would at all times have means within reach to regulate the currents and unbalance the tendency to synchronous neutralization. The field magnets may also be wound with parallel wires, one of which carries the induced alternate current, the other a direct current supplied by the battery.

For convenience I have shown the field wires wound on the peripheries of the magnets. If desired they may be placed on the inside between the polar projections.

What I claim as new, and desire to secure by Letters Patent, is—

1. An electric train-brake, comprising a dynamo on each car, a magnetic clutch connected with said dynamo, and brake gearing operated by said clutch, substantially as described.

2. An electric train-brake, comprising a dynamo on each car, a magnetic clutch connected with said dynamo, and a drum operated by said clutch, substantially as described.

3. An electric train-brake, comprising a field magnet, an armature having its circuit permanently closed through a magnetic clutch, brake gearing operated by said clutch, and means for opening and closing the field, substantially as described.

4. An electric train-brake, comprising a field magnet, an armature having its circuit closed through a magnetic clutch, couplings connected with the terminals of the field, and means for automatically grounding said terminals when the train breaks in two, substantially as set forth.

5. An electric train-brake, comprising a field magnet, an armature having a magnetic core or cores projecting from one face thereof, a loose drum having a magnetic face adjacent to said cores, and a closed armature winding including the cores, substantially as described.

6. An electric train-brake, comprising a stationary electro-magnet on the car, a rotating electro-magnet arranged in inductive relation to the stationary one, means for rotating said magnet from the car axle, a magnetic clutch in circuit with said magnet, and means for controlling the circuit of the stationary electro-magnet, substantially as described.

7. The combination with a car axle, of a drum mounted loosely thereon, a magnetic clutch for connecting the drum and the axle, and an electric generator driven from said axle, substantially as set forth.

8. An electric brake, comprising a stationary annular field magnet, an armature concentric therewith, and carrying magnetic cores on one face, a closed armature winding including said cores, a loose drum having a magnetic face adjacent to said cores, and a rheostat in the field circuit, substantially as described.

9. The combination with a plurality of cars, each provided with a field magnet, of couplings between the cars connecting said fields in series, a ground circuit at each end of each car, and means for automatically connecting said couplings with said ground circuits upon any car that is detached from the train, substantially as described.

10. In an electric train-brake, the combination with a car axle, of a stationary field magnet concentric therewith, an armature fast upon the axle, a drum loose upon the axle, and a magnetic clutch in circuit with the armature, substantially as described.

11. In an electric train-brake, the combination with a car axle, of a stationary field magnet concentric therewith, an armature fast upon the axle and carrying cores arranged around the axle with their faces in the same plane of rotation, an armature winding continued in closed circuit around said cores, and a drum loose on the axle and having a magnetic face adjacent to said cores, substantially as set forth.

12. An electric train-brake, comprising a plurality of stationary field magnets arranged in series with a rheostat, an armature rotating within each field and having its circuit closed, and a magnetic clutch included in said closed circuit, substantially as set forth.

13. In an electric train-brake, the combination with a car provided with a dynamo, of a field circuit coupling consisting of a plunger, a spring engaging said plunger, and a ground circuit with which said spring keeps the plunger normally in contact, substantially as described.

14. The combination with a car, of a dynamo driven by the car axle and having its field terminals normally grounded, means for breaking said ground circuit, and brake mechanism adapted to be operated by said dynamo, substantially as set forth.

In testimony whereof I have hereto set my hand this 21st day of July, 1892.

JOHN C. HENRY.

Witnesses:
ALLEN C. FITCH,
L. M. WHITAKER,